Aug. 29, 1961 A. RYSTI 2,998,147

ARRANGEMENT FOR PILING OF LUMBER IN LAYERS FOR DRYING

Filed Jan. 8, 1957 10 Sheets-Sheet 1

INVENTOR.
ALPO RYSTI
BY
Albert M. Parker
ATTORNEY.

Aug. 29, 1961 A. RYSTI 2,998,147

ARRANGEMENT FOR PILING OF LUMBER IN LAYERS FOR DRYING

Filed Jan. 8, 1957 10 Sheets-Sheet 2

INVENTOR.

ALPO RYSTI

BY Albert M. Parker

ATTORNEY.

ARRANGEMENT FOR PILING OF LUMBER IN LAYERS FOR DRYING

Filed Jan. 8, 1957 10 Sheets-Sheet 3

INVENTOR.
ALPO RYSTI
BY Albert M. Parker
ATTORNEY.

INVENTOR.
ALPO RYSTI
BY
Albert M. Parker
ATTORNEY

ARRANGEMENT FOR PILING OF LUMBER IN LAYERS FOR DRYING

INVENTOR.
ALPO RYSTI
BY
Albert M. Parker
ATTORNEY

INVENTOR.
ALPO RYSTI
BY
Albert M. Parker
ATTORNEY.

ARRANGEMENT FOR PILING OF LUMBER IN LAYERS FOR DRYING

Filed Jan. 8, 1957 10 Sheets-Sheet 7

INVENTOR.
ALPO RYSTI
BY
Albert M. Parker
ATTORNEY.

INVENTOR.
ALPO RYSTI
BY Albert M. Parker
ATTORNEY.

INVENTOR.
ALPO RYSTI
BY
Albert M. Parker
ATTORNEY.

ARRANGEMENT FOR PILING OF LUMBER IN LAYERS FOR DRYING

Filed Jan. 8, 1957 10 Sheets-Sheet 10

INVENTOR.
ALPO RYSTI
BY Albert M. Parker
ATTORNEY.

United States Patent Office 2,998,147 Patented Aug. 29, 1961

2,998,147

ARRANGEMENT FOR PILING OF LUMBER IN LAYERS FOR DRYING

Alpo Rysti, Kaukas, Finland, assignor to Oy. Kaukas Ab., Kaukas, Finland, a Finnish company Filed Jan. 8, 1957, Ser. No. 633,139
14 Claims. (Cl. 214—6)

When drying lumber it is of the greatest importance that the air circulation between the lumber pieces in the piles can take place as freely as possible. For this purpose inserts are put in, or spacing ribs between the different layers. Dependent upon if the drying process is to be effected in drying plants or in open lumber yards the lumber pieces in each layer are laid either close to each other or with mutual spaces. In the first mentioned case the layers are usually formed so, that lumber pieces are transported together by means of conveyors so that in the latitudinal direction of the lumber pieces spaces are formed extending from the end borders of the layer at least along part of the length of the lumber pieces. Thereafter the so formed layer is carried on further as a unit to the piling place by means of devices that after the final piling of the layer are returned to their initial position. This way of piling has shown extremely advantageous regarding the air circulation, but difficulties have arisen thereby that the mutual position of the lumber pieces have been changed during the feeding of the layer to the pile. The difficulties are specially noticeable at stapling for drying in lumber yards, as the spaces between the lumber pieces preferably must extend across the whole layer, i.e. along the whole length of the lumber piece.

The purpose of this invention is to eliminate the above named difficulties and this is realized thereby that devices are arranged to be inserted into the spaces between the lumber pieces after formation of the layer and before the feed of it has been effected and in front of, as well as behind, the farthest lumber pieces of the layer in order to maintain the mutual position of the lumber pieces unchanged in such position during the whole feed of the layer.

Preferably, the devices consist of spacer members which turn freely in relation to each other in the feeding direction above the collected layer to such an extent in the direction mentioned, that at least two, preferably more, spacer members mainly correspond to the width of one piece of lumber. Suitably the spacer members by means of open sided mounting collars or the like are turnably mounted on a tubular shaft throughout a length corresponding to that of the layer. Said tubular shaft is fitted with a stop limiting the free turning motion of the spacer members. In addition, the tubular shaft is longitudinally slidably and rotatably mounted on a stationary mounting shaft extending over the gathered layer and the piling position to guide the tubular shaft and, by means of the spacer members respectively inserted and lying on the lumber pieces, to move the layer during the feeding of the tubular shaft to the piling place. The turning spacer members applied freely in relation to each other on the tubular shaft are brought into position to fall down on the ready layer, whereby some of the spacer members will drop into the spaces between the lumber pieces, while the others will come in contact with the lumber. By making the spacer members narrow enough and having enough of them, the desired spacing between the lumber pieces can be maintained by the teeth falling into the already existing spaces to fill them.

In the following the invention will be described with reference to a form of execution shown as an example on the attached drawing, to which, however, the invention is not to be considered as being limited.

Figure 1:
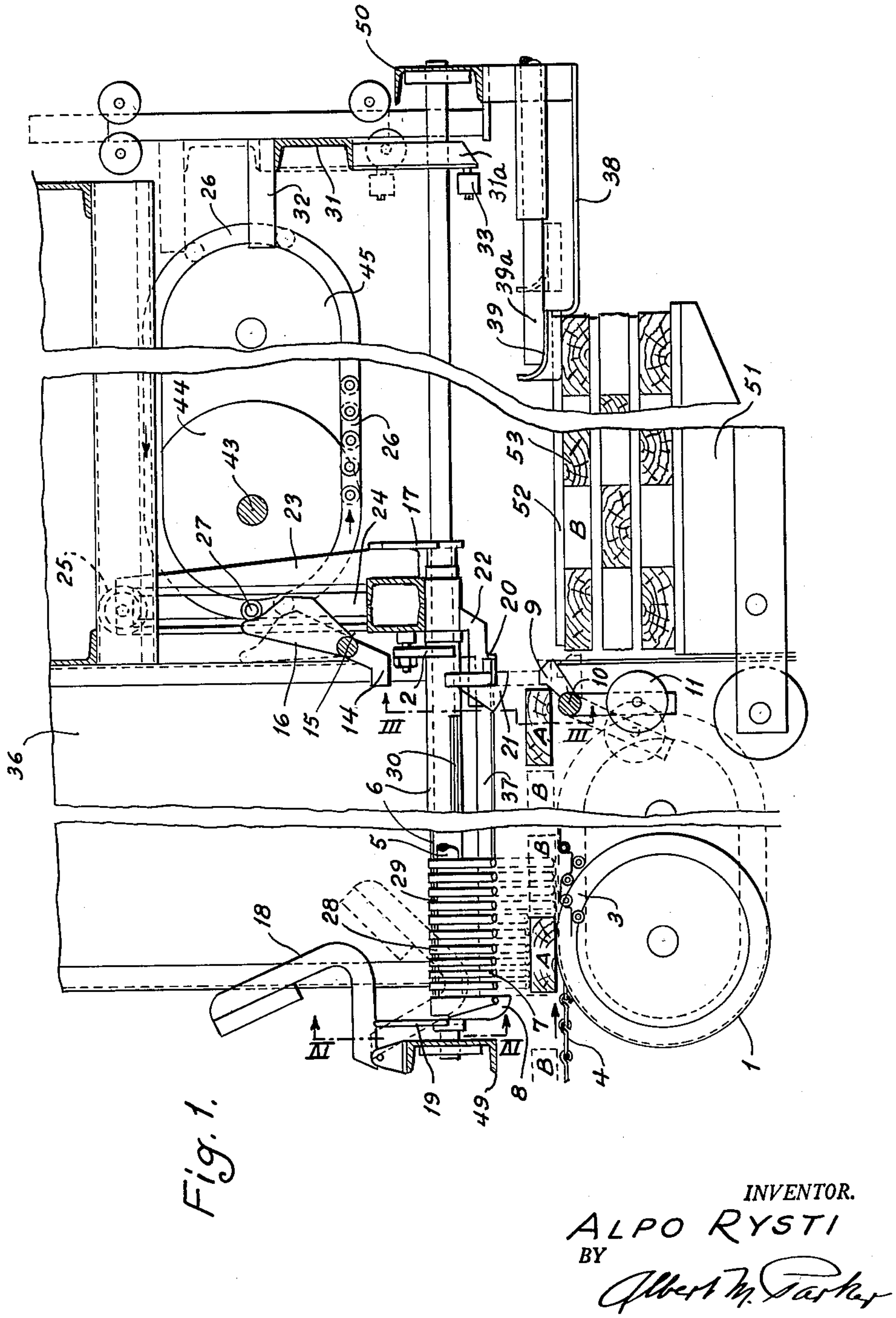
FIGURE 1 shows a schematic side view of a piling plant for boards in its entirety.

In the drawing, 4 signifies a number of transport chains, or the like, transporting the boards, lying crosswise over the chains and intended for piling, to the place where the layers are formed. The boards A and B are loaded on the chains 4 either by machinery or by hand with desired spaces and are transported onwards to a stop 9 arranged at the front end of the place where the layer is formed and where the first board of the layer is stopped. Hereafter each of the following boards is stopped as soon as it has reached the board lying in front of it, until a layer is wholly formed. During the transport the boards are distributed sideways, being moved alternately sideways to one side and the other of the longitudinal centre line of the layer, in which way the outer ends of alternate boards will come into line with the longitudinal side edges of the layer. The side displacement can also be effected either wholly or partially by hand. No arrangements for the carrying out of this distribution have been shown on the drawing, as such are not believed necessary for an understanding of the invention.

Besides the above named transport chains 4, of which there would be six in a complete plant as shown, there are endless roller chains 3, one at each longitudinal side of the layer, running across pulley wheels 46, 47. The first pulley wheels 46 are mounted on the same shaft as the pulley wheels 48 for the chains 4 and are driven by this shaft. On the shaft of the pulley wheels 47 a friction wheel 1 is mounted. It is fixed on the shaft by suitable means such as a spring pin (not shown).

Figure 15:
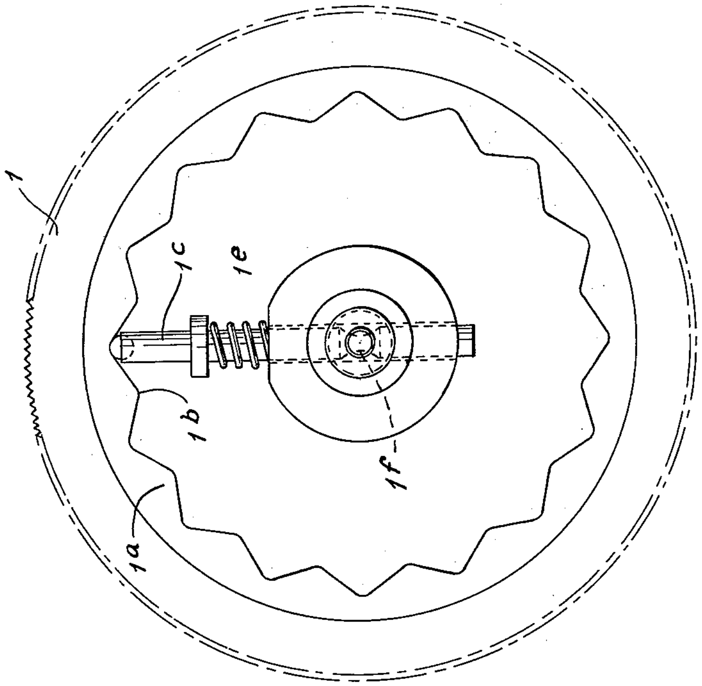
FIG. 15 is an end elevation thereof viewing FIG. 14 from the right hand end thereof.
Figure 14:
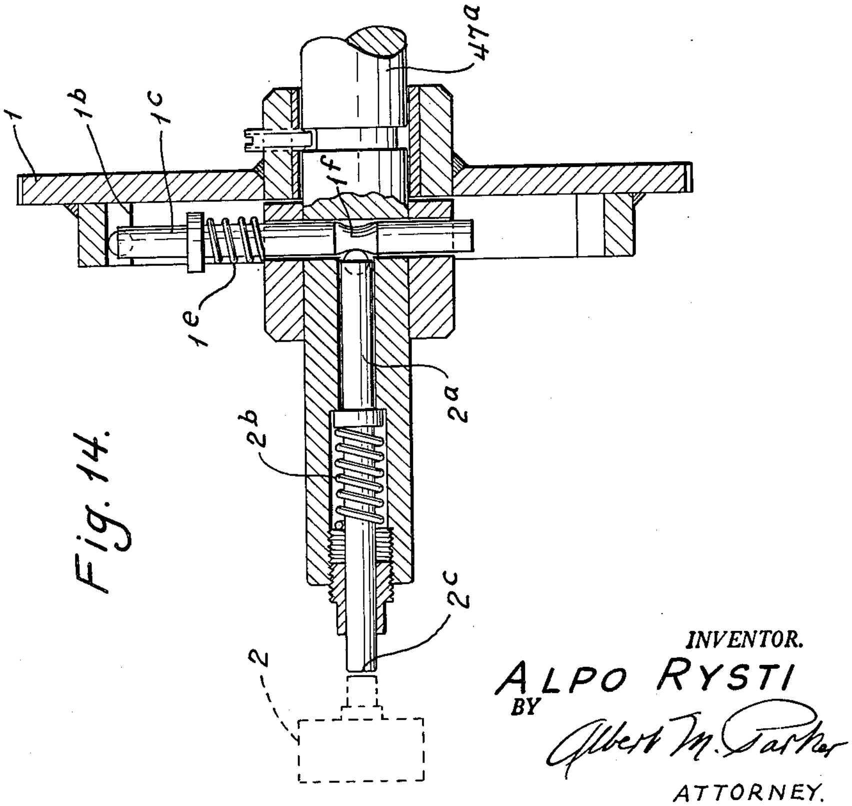
FIG. 14 is a vertical section through the starting arrangement of the invention.

As soon as a layer is formed and the last board has been stopped in a position above the friction wheel 1, that board tends to stop the rotation of the friction wheel, while the axle is still rotating. A suitable coupling device used in conjunction with the friction wheel 1 (FIG. 2), is shown in detail in FIGS. 14 and 15. The friction wheel 1 having the inner gear ring 1*a* rigidly secured thereto is mounted on the shaft 47*a* of the chain wheel 47 (FIG. 2), so that it can rotate with respect to said shaft but is prevented from axial movement by means of the fixing pin shown. A radial spring pin 1*c* is passing through a bore in said shaft and pressed against the gear ring 1*a*. One end of another axial spring pin 2*a* provided concentrically within said shaft 47*a* abuts against a thinned neck 1*c* on said radial spring pin, and the other end 2*c* abuts against the starting device or switch 2 of the motor 41 driving the chain wheels 44 and 45 and thus the chain 26 and the drive pin 27 mounted thereon (see FIGS. 1 and 2).

When a complete layer of boards has been fed by the chains 4 the last board will stop in a position above the friction wheel 1 and thus prevent it and the inner gear ring 1*a* from rotating further. The radial spring pin 1*c*, however, will continue to rotate with the shaft 47*a* of the chain wheel 47, and thus it moves over a cog 1*b* of the inner gear ring 1*a* being at the same time forced outwardly in its axial direction. During this axial movement a part of the radial spring pin of full thickness will come into contact with the axial spring pin 2*a* forcing it to the left to actuate the switch 2 which in its turn starts the motor 41, chain wheels 44 and 45 etc. as explained above. Instead of the above described device for obtaining impulse for the starting of the feed arrangement other known devices may be used.

Figure 4:
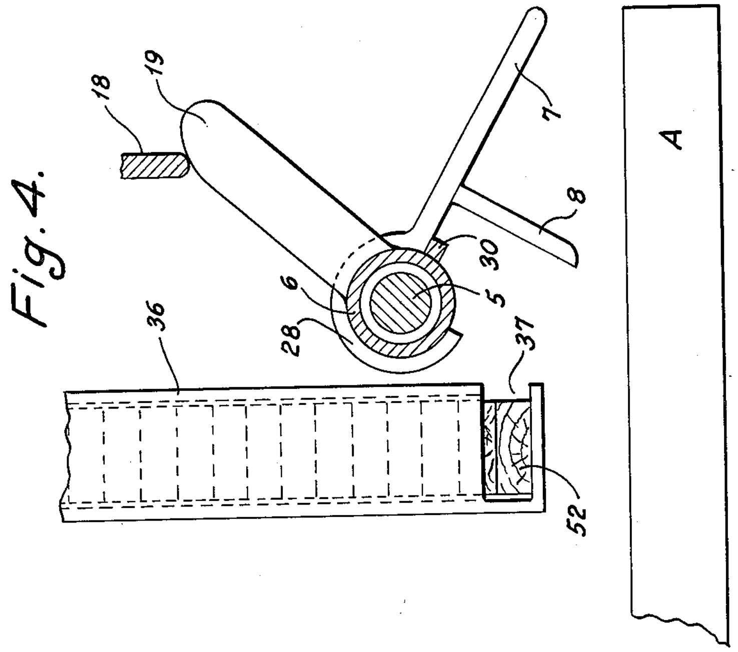
FIGURES 3 and 4 show sections on an enlarged scale along the lines III—III and IV—IV respectively of FIGURE 1, with certain parts in inoperative position.

The characteristic cam arrangement for the invention consists of a suitable number of spacer members 7, the total width of the set of which in the feeding direction mainly corresponds to the length of a ready layer. The spacer members 7 are rotatably mounted with respect to each other on a tubular shaft 6, which extends in the feeding direction of the lumber, in a length somewhat greater than that of the total extent of the set of spacer members 7. Only part of the set of spacer members has been shown in FIGURE 1. The spacer members are mounted to turn on the tubular shaft 6 by means of open sided mounting collars 28 (FIGURE 4). Fixed spacers 29 are seated on the tubular shaft 6 between the collars 28. These keep the spacer members apart and assure their free mutual movement. The tubular shaft 6 is fitted with a longitudinal stop shoulder 30 (see FIGURE 1), limiting the free turning motion of the spacer members on the tubular shaft 6. By rotating the tubular shaft 6 the spacer members can be brought to the position shown in FIGURE 4.

The tubular shaft 6 is rotatably mounted and also longitudinally slidably mounted on a stationary mounting shaft 5, the length of which is about twice as long as that of the tubular shaft 6. It is positioned above and extends beyond both the place of the formation of layer and that of the piling place.

The front ends of the tubular shafts 6 (seven of which would be present in a complete apparatus of the type shown), as viewed from the feeding direction are combined with each other by means of a laterally extending carriage 23, which on both sides of the center has a part with a raised portion formed with a vertical slot 24 therein. The carriage 23 together with the tubular shafts 6 fixed thereto are driven by a mechanism (FIGURE 2) consisting of a motor 41 that, by suitable gearing, rotates the axle 43. This suitably drives two endless drive chains 26 running respectively across pulley wheels 44, 45. A pin 27 connected with the respective chain 26 engages in the corresponding slot 24 in the carriage 23 and drives the carriage to and fro across the piling position as soon as an impulse is received resulting from the actuation of the starting device 2 by the friction wheel 1. This to and fro motion is intermittent and is stopped as soon as the carriage 23 has returned to its initial position, as seen in FIGURE 1, by the carriage actuating a circuit breaker 40 (FIGURE 2) that stops the motion until a new starting impulse is received.

Figure 3:
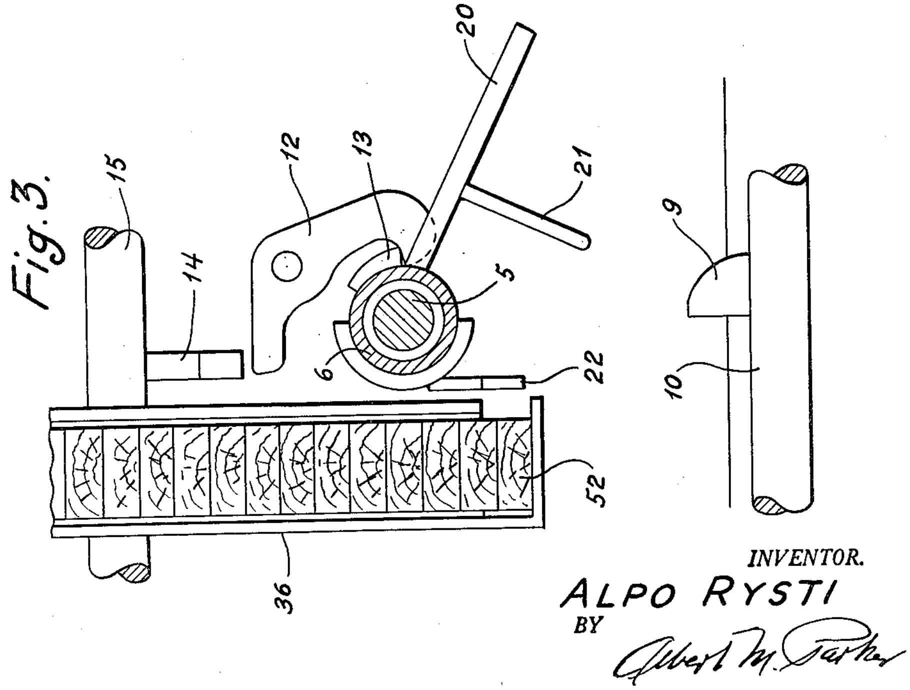

The swinging of the spacer members to and from an active position is described with particular reference to FIGURES 3 and 4. During the formation of the layer the spacer members 7 are in a raised, inactive position. The raising has been effected by a rotatably mounted retaining mechanism 12 on the carriage 23 in the form of a fork having one of its branches (the right one in FIGURE 3), engaged with a pawl 13 on the tubular shaft 6, whereby the stop shoulder 30 has turned the spacer members upwards.

Figure 6:
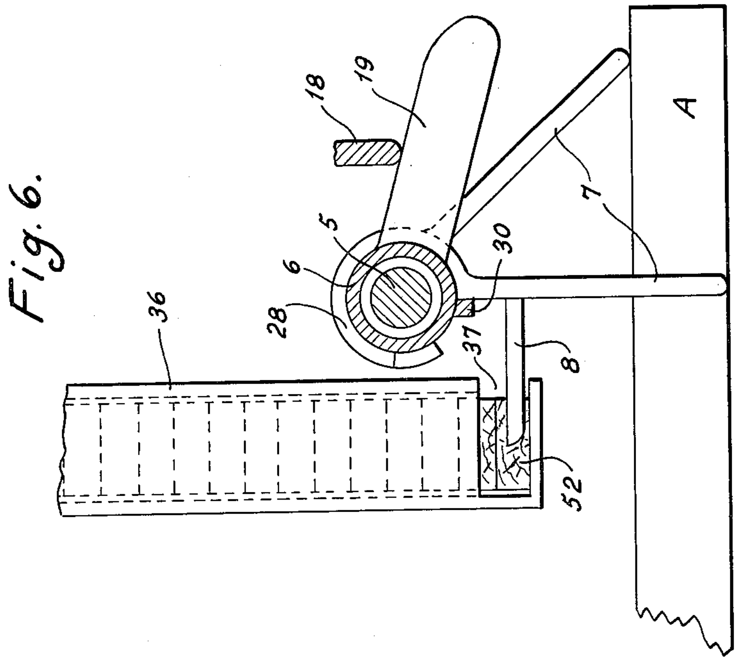
FIGS. 5 and 6 are respectively similar to FIGS. 3 and 4 but show the parts in operative position.

As soon as the friction wheel has imparted the starting impulse, the driving pins 27 move downwards on the circumference of the wheel 44, each actuating its own release arm 16, which thereby is forced to swing from its position marked with full lines in FIGURE 1 to the position shown by dash lines, turning with it a release axle 15, on which the arms 16 are carried. At the other side of the axle 15 release pins 14 are mounted, one for each tubular shaft. Each of these actuates the one branch of its respective retaining mechanism 12 (FIGURE 3), so that the other branch thereof is brought out of mesh with the pawl 13 (see FIG. 5). Now the spacer members can swing downwards by their own weight and by their contact with the stop shoulder 30 the tubular shaft 6 also is turned from the position shown in FIG. 4 to the position shown in FIGURE 6. The spacer members that hit the layer of the lumber stop there, while the remainder fall down into the spaces between the boards, as seen in FIG. 6, and prevent the mutual displacement of the boards in the feeding direction.

Along with the movement of the spacer members a release arm 20 fixed to each tubular shaft 6 is also turned downwards (FIGURE 5) actuating the stop 9 by pressing it downwards and in doing so turns a common axle 10 for the respective stops 9 (FIGS. 1 and 3). The stops are equipped with counterweights 11 fixed to the axle 10 and tending to keep the stops in the position shown in full lines in FIGURE 1. As the lumber layer passes across the stops 9 the boards are lying close to each other, wherefore at least part of the stops 9 during this passing are always influenced by the weight of the layer which prevents the stops 9 from returning to their positions of rest before the ready layer in its entirety has passed over to the piling position.

The feeding of the layer towards the piling position begins as soon as the drive pins 27 hit the vertical edge of the slots 24 in the carriage 23.

The feeding of the layer to the pile is thus effected partly by the carriage 23 and partly by the chains 3 and 4, which, as soon as the layer is formed, have glided along the lower side of the layer, whereby the rollers of the roller chains 3 have contributed in keeping the mutual position of the boards unchanged, before the spacer members have fallen down between the boards.

Figure 8:
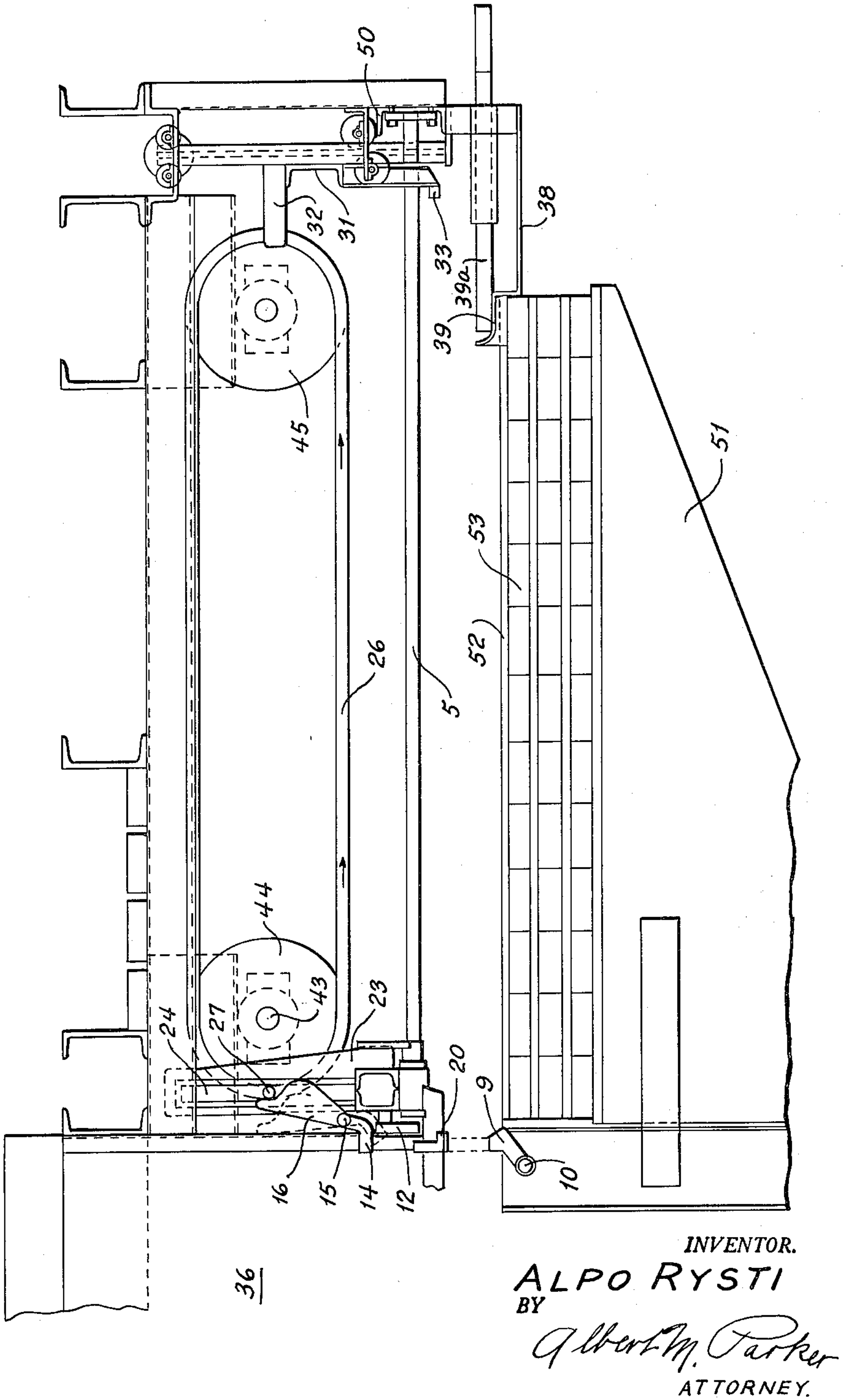
FIG. 8 is a diagrammatic side view of the piling end of the machine—a continuation of what is shown in FIG. 7.

When the carriage has reached its farther end position above the pile, the new layer has been moved into position above the previous layer 53, that is, in the pile with the strips 52 laid on it. The pile is preferably formed on a suitable hoist or elevator shown in FIGS. 1 and 8 and in detail in FIG. 16. This elevator is in the form of a plurality of bracket-like members which extend out in parallel relationship from the supports on which they ride up and down. The layers 53 of the boards being piled (FIGS. 1 and 8), lie across these spaced arms with the strips 52 laid transversely between the layers. As each layer is completely formed, the elevator is lowered so that it can receive the next layer on top. When the pile has reached its full height the elevator is at its lowest position where the bottom of the pile is engaged between the arms of the elevator or hoist by some suitable means for rolling the pile away.

Then the elevator is returned to its highest position and the piling can begin anew.

Figures 12, 13, 16, 17:
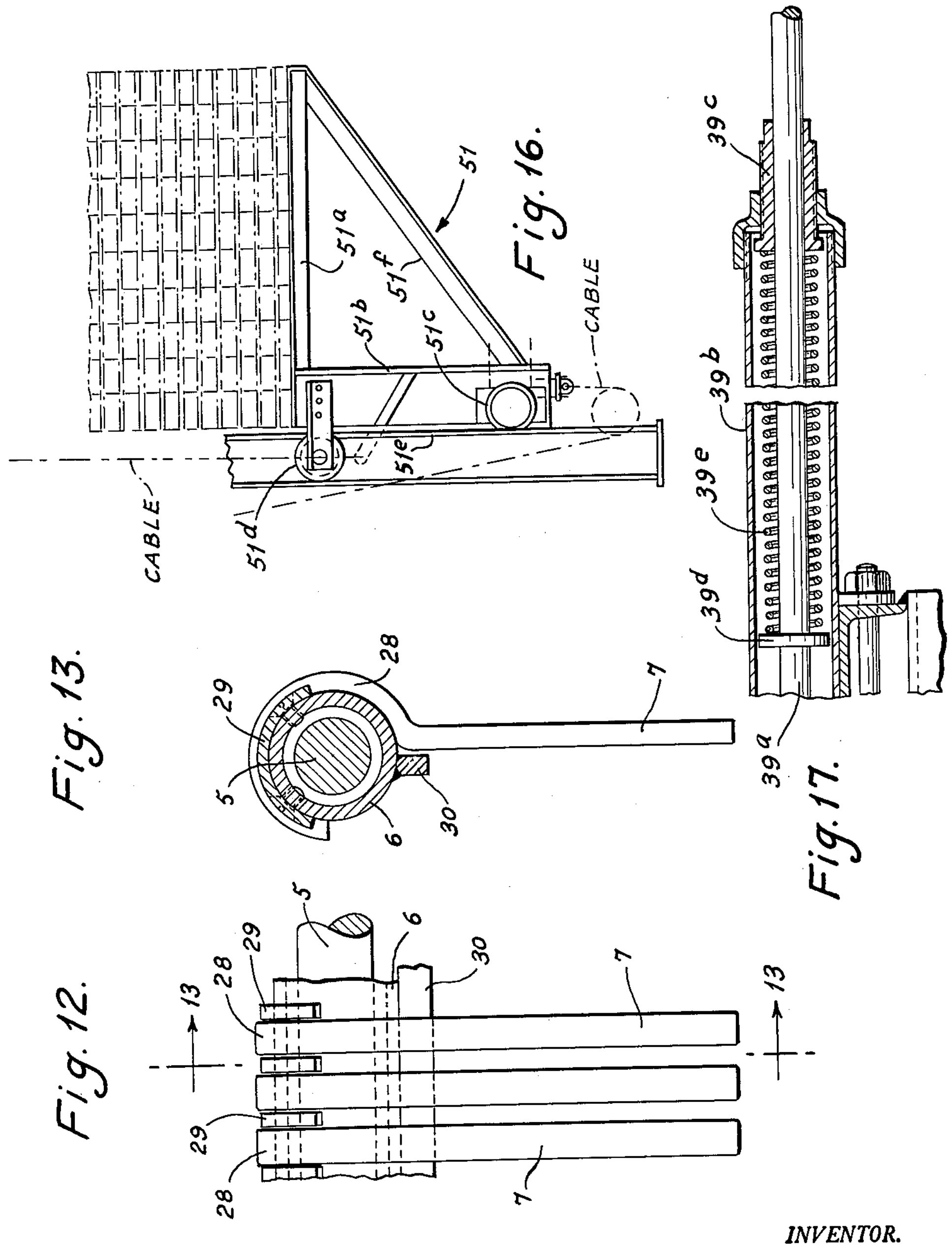
FIG. 12 is an enlarged fragmentary plan view of a plurality of the spacer members of the invention and the mounting thereof.
FIG. 13 is a section on line 13—13 of FIG. 12 looking in the direction of the arrows.
FIG. 16 is a front elevation of the loading elevator of the invention per se.
FIG. 17 is a part sectional, part elevational view of the counter plate for holding down the spacer strips and the spring means for actuating the same.

The details of one of the elevator elements are shown per se at 51 in FIG. 16. Thus one of the parallel arms is shown at 51*a* and is carried by a carriage 51*b*, which carriage, by means of suitable rollers 51*c* and 51*d*, rides up and down on the flange 51*e* of a suitable column. A brace 51*f* supports the end of the arm 51*a* with respect to the carriage 51*b*. Vertical movement of the elevators is effected by some common form of hoisting mechanism operated by cables, or other means. In FIG. 16 the elevator is shown as substantially fully loaded and about ready to discharge the pile.

Figure 2:
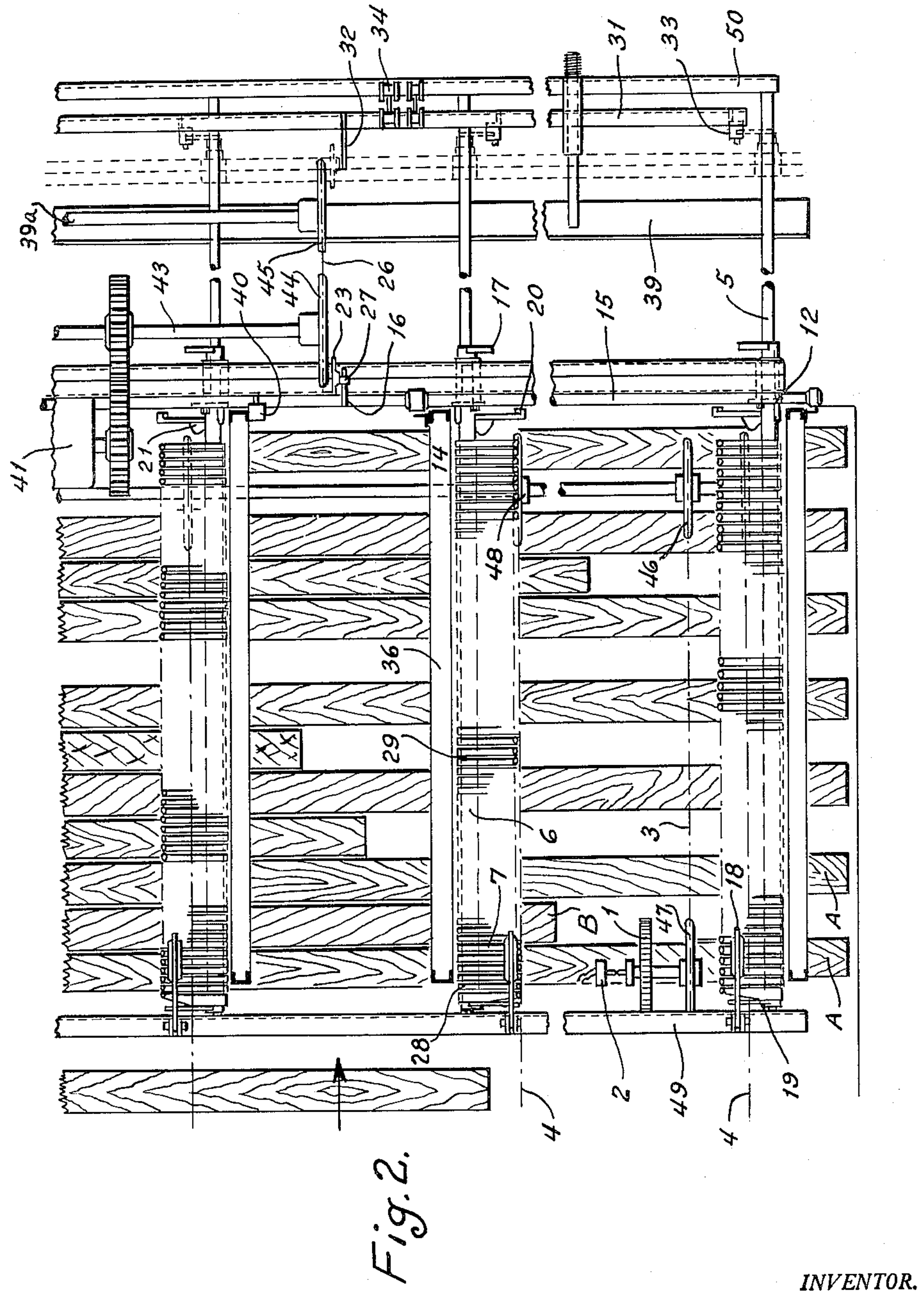
FIGURE 2 is a corresponding schematic plan view of the plant.

The ends of the stationary shafts 5 to the right, as viewed in FIGURES 1 and 2, are connected by a transverse U beam 50. Close to it is a slide device 31 extending across the width of the pile, equipped with lifting rods 32, actuated by the drive pin 27, when this pin reaches its other end position. When the drive pin raises the lifting rods and thereby the slide 31, a number of stops 33 connected to tail pieces 31*a* carried by the slide 31 actuate swinging arms 17 fixedly connected to their respective tubular shafts 6. On account of this the tubular shafts 6 are turned. This causes the shoulders 30 to lift the spacer members 7 out of the mesh with the layer. The tublar shafts 6 are now in the position shown in FIGURE 3, whereby the one branch of the retaining member 12 is, on account of its own weight, again hitched to the pawl 13. This position is maintained during the return of the carriage to its initial position.

A magazine for inserts, or spacing strips, can also be connected to the plant to be fed on the top of each layer. A suitable form of execution is shown on the drawing. The magazine shown at 36 is situated close to each cam group and is equipped with a special longitudinal discharge opening 37 in the lower part of the one side wall. A discharge finger 8 (FIGURE 4), which is fixedly connected to the respective tubular shaft 6 is moved into the discharge opening when the tubular shaft is freed from the pawl 12 and turned by the spacer members 7. The discharge finger 8 lies against one end of the lowest strip in the magazine and pushes this in the direction of the piling position as soon as the carriage 23 has started its feeding motion. The other end of the strip during the feeding motion is supported by a supporting member 21 fixedly connected to the release arm 20. Thus, when the arm 20 at the farther end position of the carriage is turned at the turning of the tubular shaft 6, the member 21 is swung out of the way and permits the spacing strip to fall down on the new layer of the pile.

In order to make sure that the strip during the feeding process will keep its proper position across the longitudinal direction of the lumber, a guiding bar 22 is fixed to the lower part of the carriage. This positions the front end of the insert laterally preventing it from swinging when the supporting member 21 is swung.

Before the carriage has reached its farthest end position the respective release arms 20 strike a counterplate 39 (FIGURES 1 and 2), lying across the piling place.

Figure 9:
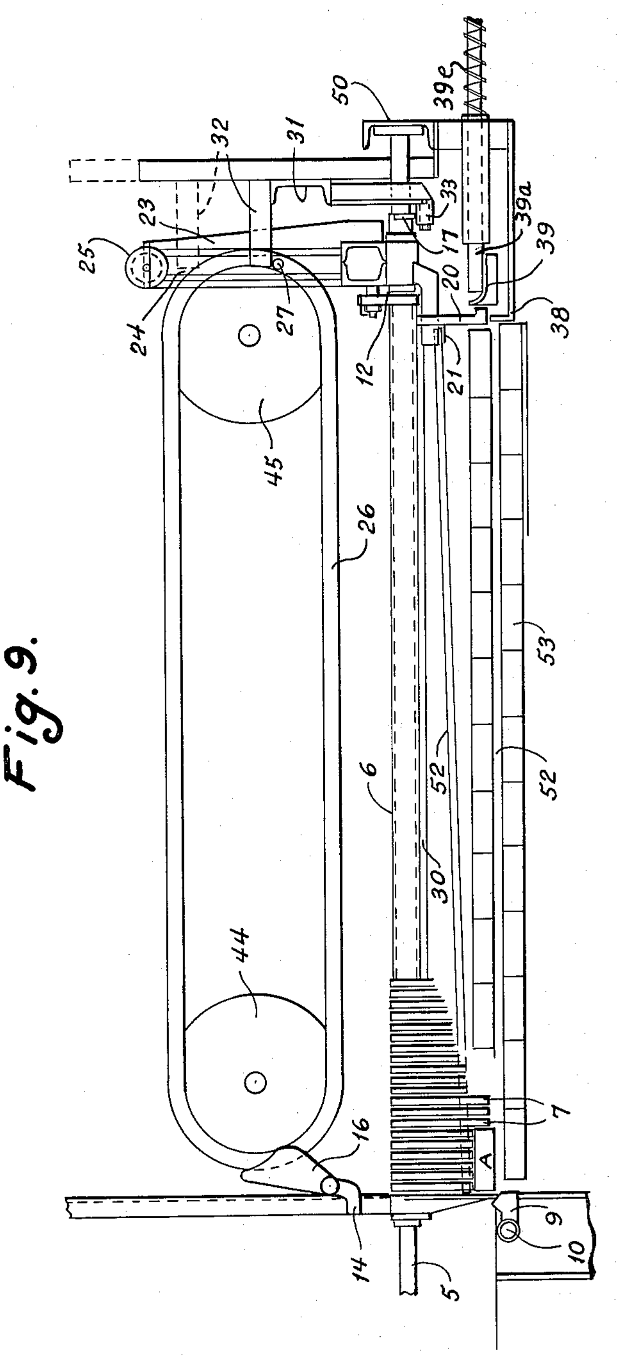
FIG. 9 is a view similar to FIG. 8 showing the advancing and spacing means in its position to deposit the lumber planks.
Figures 10, 11:
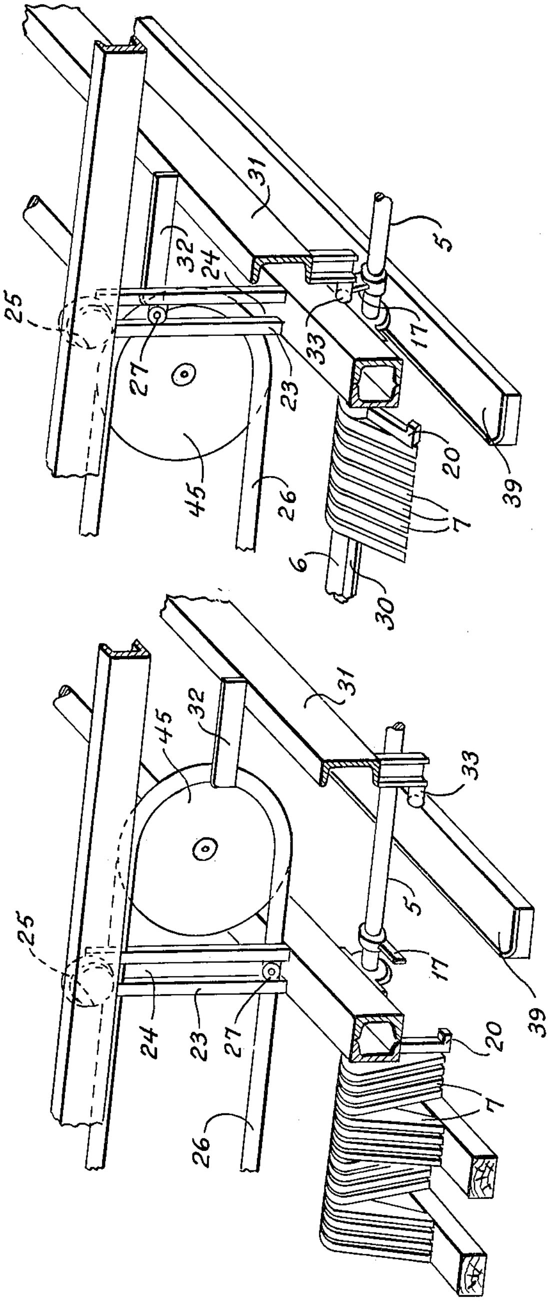
FIG. 10 is a detailed perspective view of a portion of the spacing and transporting mechanism with logs in place.
FIG. 11 is a detailed perspective view similar to that of FIG. 10 showing the releasing of the log engaging means and the operation of the control mechanism therefor.

The counterplate 39 (FIGS. 1, 2, 8, 9, 10 and 11) is mounted on a plurality of parallel shafts 39*a* (FIGS. 1, 9 and 17), which are suitably mounted for sliding movement in housings 39*b* and to extend through a bushing 39*c* at the end of the housing. The shaft carries a flange 39*d* and a spring 39*e* overlies the portion of the shaft 39*a* between the flange 39*d* and the inner face of the bushing 39*c*. Thus when the arm 20 pushes the counterplate out of the way for the application of a layer of boards it does so against the acion of the spring 39*e*. The counterplate is released as soon as the tubular shaft 6 is turned and returns to close to the front edge of the newly piled layer. It remains in this position until the hoist has been lowered to a suitable height for receiving the following layer. As soon as this is done the counterplate on account of the action of the spring 39*c* returns to its initial position above the ends of the spacer strips which are thus prevented from being raised when the feeding of the new layer is started. Below the counterplate there are stops 38 bent at an angle and lying against the ends of the respective spacer strips.

Figure 5:
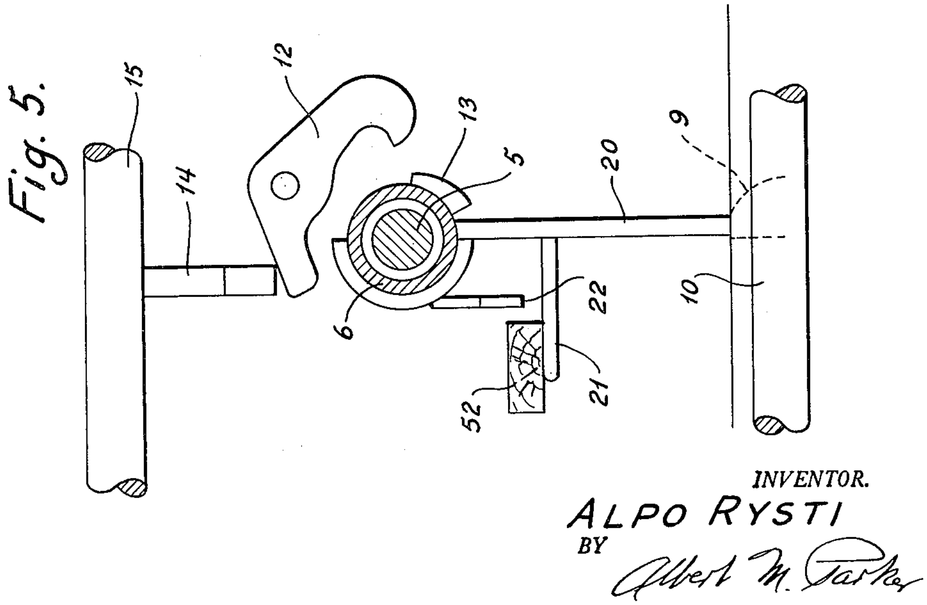
Figure 7:
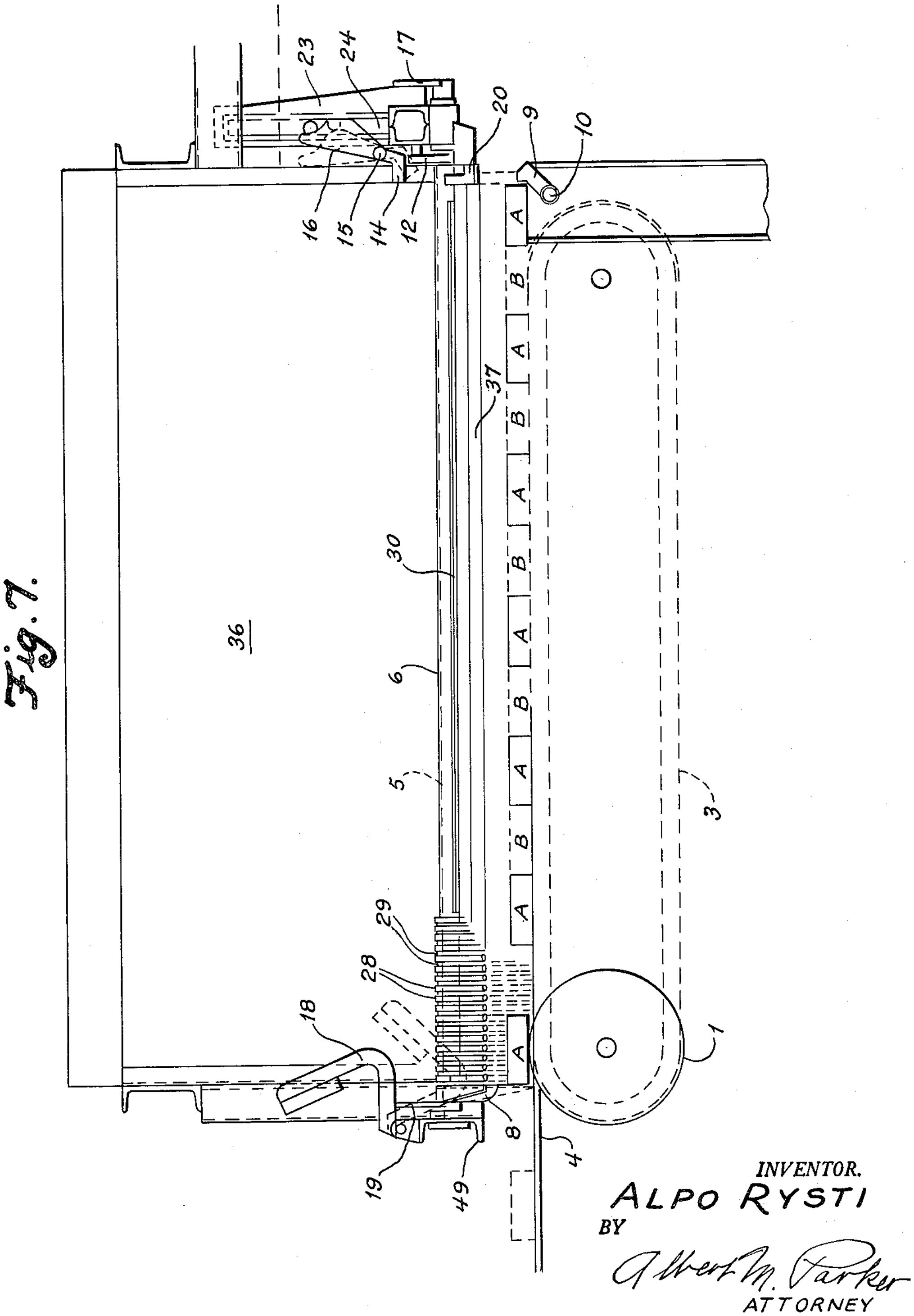
FIG. 7 is a side view of the machine at the loading end in diagram.

The operation of feeding the strips from the magazine takes place in the following way:

To the rearmost member 7, as viewed in the feeding direction, there is fixedly connected a discharge finger 8 which, when the tubular shaft 6 is released and the members 7 are turned down, comes to the position shown in FIG. 6 behind the lowermost strip 52 in the discharge opening 37 of the magazine 36. When movement of the carriage 23 with the tubular shafts 6 is started to transfer the ready built layer to the pile the discharge finger 8 while moving with the shaft 6 pushes the lowermost strip out of the magazine. At the same time the supporting member 21 fixedly connected to the tubular shaft 6, supports the forward end of the strip, as shown in FIG. 5, from which figure the magazine 36 has been omitted, and when the member 21 is turned up at the farther end position of the carriage the guiding bar 22 fixedly connected to the lower part of the carriage acts with the supporting member 21 to prevent the strip from swinging so that it will fall down in the proper position on the new layer of the pile.

The stop shoulder 30 is clearly seen in FIGS. 4 and 6. It is fixedly connected to the tubular shaft 6 extending along the whole part of it supporting the fingers 7. The operation is as follows:

The carriage 23 with the tubular shafts 6 being in the position shown in FIG. 1 during the formation of the layer, the spacer members 7 are kept in the inoperative position shown in FIG. 4, because the shaft 6 is locked in place by the pawl coupling 12, 13, as shown in FIG. 3. Thus the stop shoulder 30 engages the inner end of the spacer members 7 and prevents them from falling down. When the layer is formed the release pin 14 carried by the axle 15 actuates the pawl coupling 12, 13, as shown in FIG. 5, whereby the shaft 6 is freed, and the weight of the spacer members 7 resting against the stop shoulder 30 causes the shaft 6 to turn to the position shown in FIG. 6, whereby the spacer members 7 also turn down into the spaces between or against the upper side of the boards, as shown in FIG. 6 and also in dotted lines to the left in FIG. 1. To make sure that the tubular shaft 6 will turn with the spacer members 7 there is provided the weighted lever 18 resting against the arm 19 fixedly connected to the rear end of the shaft 6.

When the layer has been transferred to the pile by means of the carriage 23, the tubular shafts 6 and the spacer members 7, and the carriage have reached their farther end position. The driving pin 27 on the chain 26 then hits the lifting rod 32 on the slide 31 thus causing the slide to rise, the stop 33 connected to the slide actuates the arm 17 fixedly connected to the front end of the tubular shaft 6. The arm 17 is swung upwardly thus causing the shaft 6 to turn. Thereby the stop shoulder 30 lifts the spacer members 7 out of mesh with the boards, and the pawl coupling 12, 13 locks the shaft 6 with the spacer members 7 in the raised position shown in FIG. 4.

The plant shown on the drawing is further equipped with a safety member 18 (FIGURES 1 and 2 to the left), fixed articulately at the end of the respective mounting shaft 5. This member is arranged to be kept in an elevated position and is supported by an arm 19 fixed to the tubular shaft. When the arm 19 is removed the member 18 can swing down towards the spacer members 7 to make sure that the tubular shaft 6 turns in the feeding direction.

In spite of the fact that the description above has dealt mainly with only one group or set of spacer members together with the tubular shaft 6 carrying them and mounting shaft 5, it is to be understood that the plant consists of a number of such mechanisms side by side and that the particular number employed is dependent upon the dimensions of the machine, also of the layer.

The idea of the invention naturally is not limited to the particular form of execution illustrated, but other embodiments can be effected within the spirit and scope of the invention.

The to and fro motion of the feeding mechanism is suitably so arranged that the first lumber piece fed in each layer reaches the stop 9 immediately after the foregoing layer in its entirety has left the stop 9.

In case the piling is intended for drying in a lumber yard whereby a space must be left throughout the length after each board in the layer, the speed of the chains 4 is adapted according to the positioning desired. Here the friction wheel 1 as well as the stops 9 and the axle 10 are left out. Instead of the stops a starting device 2 is employed, suitably positioned at the side of the pulley wheel 48 for the chains 4. The motor 41 receives its impulse when the starting device is actuated by the first board of the layer and the above described process starts. The spacer members fall down and separate a number of boards from the layer corresponding to the total width of the spacer members. The tubular shafts 6 move the layer to the piling place at a speed so adapted that the first board of the following layer fed by the transport chains 4 reaches the starting device at the very moment that the axles 6 return to the initial position, or immediately thereafter. In order that the counterplate 39 shall not push the boards fed to the piling place towards each other after the swinging up of the spacer members, it is suitable to provide the counterplate with a locking device so that it is locked in its end position (to the right in FIG. 1), when it is actuated by the arms 20. The counterplate rests in this position until the hoist has been lowered to a position where it receives the following layer. The release can take place in a suitable manner.

What I claim is:

1. Apparatus for piling lumber in layers for drying, the pieces forming each layer being longitudinally staggered to provide spaces between at least portions of the lengths of every other one of said pieces, which comprises, conveyor means for transporting said layers as a unit from a layer forming position to a pile, means carried by said conveyor means for insertion into said spaces to maintain said spaces during said transporting, and means carried by said conveyor means for rendering said space retaining means ineffective during the return of said conveyor means to layer forming position.

2. Apparatus according to claim 1 in which said insertion means are teeth members and mounting means are provided mounting said teeth members on said conveyor means above said layer in freely turning relationship with respect to each other, at least two of said teeth members corresponding to the width of one piece of lumber.

3. Apparatus according to claim 2, said conveyor means including a tubular shaft substantially as long as the width of said layer, an elongated mounting axle for said tubular shaft and on which said tubular shaft is rotatably and slidably mounted, said axle extending across both said layer forming position and the piling position for said layers, and said mounting means for said teeth members being bushings mounted over said tubular shaft.

4. Apparatus according to claim 3 and including means carried by said conveyor means for maintaining said teeth members out of operative position during the return of said tubular shaft from piling position to layer forming position.

5. Apparatus according to claim 3 and including locking means mounted on said conveyor means and on said tubular shaft for locking said tubular shaft in rotated position with said teeth in elevated position and means for unlocking said locking means to enable said teeth to fall by gravity into operative position when said tubular shaft is returned to overlie said layer forming position, and means to rotate said tubular shaft to raise said teeth and lock the same in raised position when said tubular shaft is in position overlying said pile.

6. Apparatus according to claim 3 including a plurality of tubular shaft members each carrying sets of teeth and mounted on mounting axles in parallel spaced relationship, and a common carriage member supported by said tubular shafts and formed for moving said tubular shafts longitudinally on said axles.

7. Apparatus according to claim 6 and including, endles chain means carried by said apparatus, said endless chain means including a pin extending therefrom and said carriage being formed with a vertical slot therein, said pin being seated in said slot for moving said carriage to and fro.

8. Apparatus according to claim 5 and including a stop member for engaging the first piece of lumber in a layer at said layer forming position, means for rotatably mounting said stop member beneath said layer forming position for movement into and out of said stop position, and means carried by said tubular shaft for releasing said stop member to permit said layer to be fed from layer forming position.

9. Apparatus in accordance with claim 6 and including said locking means for said tubular shaft comprising, fork means, means for rotatably mounting said fork means on said carriage, a pawl on said tubular shaft and said locking means having a member formed for locking engagement with said pawl.

10. Apparatus according to claim 1 and including, a friction wheel for engagement by the pieces of lumber forming said layer, and means for braking said friction wheel on the completion of the formation of said layer, said braking means including impulse means for actuating the feeding of said layer to the pile.

11. Apparatus according to claim 1 and including a magazine for insert strips mounted above said layer forming position, said magazine being formed with a discharge opening to discharge insert strips onto the formed layer.

12. Apparatus according to claim 11 and including, said conveyor means including a tubular shaft, a discharge finger fixedly connected with said tubular shaft, said discharge finger being positioned at the rear of said discharge opening, and means for operating said dischrge finger for discharging insert strips from said magazine.

13. Apparatus according to claim 1 and including a counteracting member, means for mounting said counteracting member above said pile forming position, said mounting means including spring loading means for returning said counteracting means to initial position once said pile has been lowered to receive the following layer.

14. Apparatus in accordance with claim 12 and including, supporting means for carrying the front end of the strips discharged from said magazine, said supporting means being carried by said tubular shaft.

References Cited in the file of this patent

UNITED STATES PATENTS 983,892 Graham ______________ Feb. 14, 1911